July 26, 1927.
O. H. WALTERS
HOSE COUPLING
Filed June 3, 1926
1,637,095
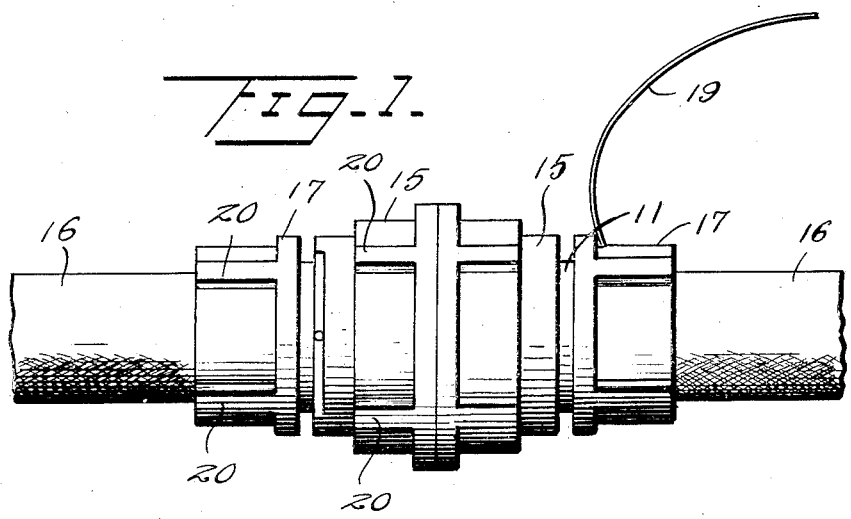
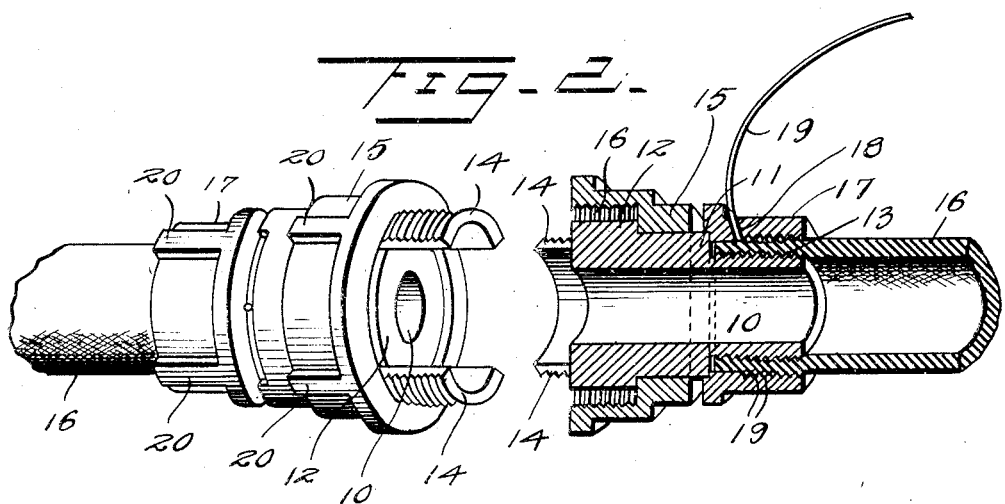
Inventor
O. H. Walters
By
Attorney Patented July 26, 1927.

1,637,095

UNITED STATES PATENT OFFICE.

OLIVER H. WALTERS, OF TACOMA, WASHINGTON, ASSIGNOR OF ONE-HALF TO HERBERT M. SHOCKLEY, OF TACOMA, WASHINGTON.

HOSE COUPLING.

Application filed June 3, 1926. Serial No. 113,560.

This invention relates to new and useful improvements in hose couplings, and particularly to quick detachable couplings of this character.

One object of the invention is to provide a hose coupling wherein the parts are identical in construction, and which do not require packing.

Another object is to provide a hose coupling of this character which includes novel means for securing the hose ends to the coupling heads.

Other objects and advantages will be apparent from the following description when taken in connection with the accompanying drawing.

In the drawing:

Figure 1 is an elevation of a hose coupling in coupled position.

Figure 2 is a perspective view of the coupling with the parts separated, one of the parts being in elevation and the other part in section.

Referring particularly to the accompanying drawing it will be seen that the two parts of the coupling are identical in construction, therefore a description will be given of only one part.

In the drawing, 10 represents the innermost portion of the coupling head, which is in the form of a pipe, having the external stepped shoulders 11 and 12, and having one end externally threaded, as shown at 13. From the other end of the member 10 there extend the oppositely arranged and externally threaded quarter cylindrical members 14, such members being arranged to engage within the spaces between the corresponding elements in the other coupling head, and have its threads properly aline with, and form continuations of the threads of the other head. Slidably engaged on the member 10 is a sleeve 15, said sleeve being formed with internal threads 16, at one end, for engagement with the threads of the matching extensions 14, of the two heads, when said heads are placed in abutting relation to each other, such internally threaded portion of the sleeve being spaced from the outer face of the member 10 a sufficient distance to permit passage of the extensions 14, of the other head into such space. The sleeve 15, when properly moved into engagement with the extensions 14, is adapted to abut against the before-mentioned shoulder 12. Engaged on the externally threaded end of the member 10 is the end of the hose 16, and engaged on that portion of the hose which enclosed the said threaded portion, is a sleeve 17. This sleeve 17 is internally threaded, and formed through the sleeve is an oblique opening 18 through which the barbed end of a length of wire 19 is inserted, before the sleeve is slipped up against the shoulder 11. When the sleeve is disposed on the hose, the operator turns the sleeve so that the barbed end of the wire will bite into the hose, to remain in such position while the sleeve is rotated to carry or wind the wire into the internal threads of the sleeve, thus tightly binding the hose on the member 10.

When the two coupler heads are disposed with their extensions 14 in proper interlocking engagement, the operator rotates the sleeve 15, of each head so as to engage its internal threads with the external threads of the extensions 14, whereby the said sleeves will be brought into firm engagement with each other, and the end faces of the members 10 also firmly contacted, thus providing a water tight joint, without the use of washers, packings, or the like.

Each of the sleeves 15 and 17 is provided with external lugs 20 to facilitate gripping thereof by the operator, for rotating the sleeves.

What is claimed is:

1. A hose attaching means comprising a coupler head, a flexible hose end engaged on the coupler head, means rotatable on the hose end for winding a flexible element on the hose end within the said rotatable means, and means for holding the end of the flexible element with respect to the hose end.

2. The method of securing a flexible hose end on the externally threaded end of a coupler head consisting in providing an internally threaded sleeve having a lateral opening, placing the sleeve on the hose end, inserting the barbed end of a length of wire through the opening, into biting engagement with said hose end, and rotating the sleeve whereby to coil the wire on the hose so that said wire fills the threads of the sleeve and partially embeds itself in the hose end.

3. Means for securing a flexible hose on a coupler head, said head having an externally threaded portion, comprising an internally threaded sleeve rotatable on the hose and having an opening therethrough, and a wire having a barbed end engaged through said opening for biting engagement with the hose and winding movement on the hose and within the threads of the sleeve upon rotation of said sleeve.

4. A hose attaching means comprising a coupler head having an externally threaded end, a flexible hose end engaged on said threaded end, an internally threaded sleeve engaged on the hose end, and a flexible element having an end held by said hose end and engaged with the sleeve whereby upon rotating said sleeve said element will be wound on the hose end partially within the threads of the sleeve and partially embedded in the face of the hose end.

In testimony whereof, I affix my signature.

OLIVER H. WALTERS.